United States Patent [19]

Hellgren et al.

[11] 4,280,382
[45] Jul. 28, 1981

[54] SAW ARRANGEMENT HAVING PLURAL OPERATOR STATIONS

[75] Inventors: Hans Hellgren; Erland Marklund, both of Skelleftea, Sweden

[73] Assignee: Renholmens Mekaniska Verkstad AB, Byske, Sweden

[21] Appl. No.: 37,885

[22] Filed: May 10, 1979

Related U.S. Application Data

[63] Continuation-in-part of Ser. No. 889,527, Mar. 23, 1978, abandoned, which is a continuation of Ser. No. 717,264, Aug. 24, 1976, abandoned.

[30] Foreign Application Priority Data

Aug. 27, 1975 [SE] Sweden ............................... 7509516

[51] Int. Cl.³ .............................................. B26D 7/06
[52] U.S. Cl. ........................................ 83/106; 83/27; 83/157; 144/312; 198/369; 198/437; 209/698; 209/933
[58] Field of Search ................... 83/284, 365, 23, 408, 83/106, 84, 27, 86, 104, 157, 417; 144/242 R, 242 D, 242 H, 245 R, 309, 312, 323, 326 R; 209/698, 933; 198/369, 437; 414/293

[56] References Cited

U.S. PATENT DOCUMENTS

| | | | |
|---|---|---|---|
| 2,793,662 | 5/1957 | Oholm | 83/106 |
| 3,272,044 | 9/1966 | Obenshain | 83/106 X |
| 3,519,045 | 7/1970 | Blickenderfer, Jr. et al. | 144/312 |
| 3,565,140 | 2/1971 | Jacobsen | 144/242 R |
| 3,566,936 | 3/1971 | Golick | 144/312 |
| 3,701,408 | 10/1972 | Northsea | 144/242 R |
| 3,937,114 | 2/1976 | Joensson et al. | 14/312 X |
| 4,023,605 | 5/1977 | Hellstrom et al. | 144/312 |
| 4,031,790 | 6/1977 | Arvidsson | 144/312 X |
| 4,120,333 | 10/1978 | Hellgren et al. | 144/312 |

Primary Examiner—W. D. Bray
Attorney, Agent, or Firm—Burns, Doane, Swecker & Mathis

[57] ABSTRACT

A trimming saw arrangement comprises a root-cutting station, a trimming station, and a feed line for advancing timber, perpendicular to its longitudinal direction, through the stations and to a sorting station having a sorting conveyor. The stations include a plurality of cutting or trimming places arranged one after the other in the feed direction and a distribution flap and conveyor for distributing arriving timber to the respective places responsive to the amount of timber accumulated in a storage bin associated with each cutting or trimming place.

6 Claims, 9 Drawing Figures

SAW ARRANGEMENT HAVING PLURAL OPERATOR STATIONS

CROSS-REFERENCE TO RELATED APPLICATIONS

This application is a continuation-in-part of copending application Ser. No. 889,527, filed Mar. 23, 1978 now abandoned, which is a continuation of application Ser. No. 717,264, filed Aug. 24, 1976, now abandoned.

BACKGROUND OF THE INVENTION

The present invention relates to a trimming saw arrangement for trimming timber. Such an arrangement includes a root cross-cutting station, a trimming station and a feed line for advancing the timber, perpendicularly to its longitudinal direction, through these stations to a sorting station. The sorting station includes a plurality of compartments located beneath a sorting conveyor. The present invention also relates to a method for operating such trimming saw arrangements.

Conventional trimming saw arrangements comprising a root cross-cutting station and trimming station possess a disadvantage in that when the work in one station or the other, and particularly in the trimming station, is interrupted or in some other way blocked, the entire trimming saw arrangement must be shut down. This disadvantage has proved highly inconvenient and heretofore has obstructed utilization of the trimming saw to its fullest capacity.

The present invention has as a principle object the elimination of this disadvantage by providing a trimming saw arrangement of such a nature that disturbances, at least in the trimming station, will not result in a shutdown of the entire arrangement. The invention and the manner in which this object is achieved are described in detail in the following description, taken in conjunction with the accompanying drawings, in which:

DESCRIPTION

Figure 1:
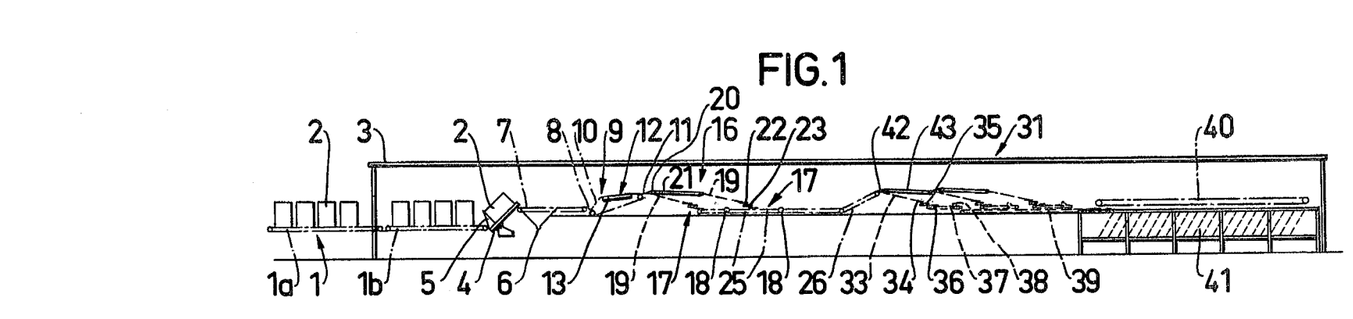
FIG. 1 is a schematic side view of a trimming saw arrangement according to the present invention.
Figure 4:
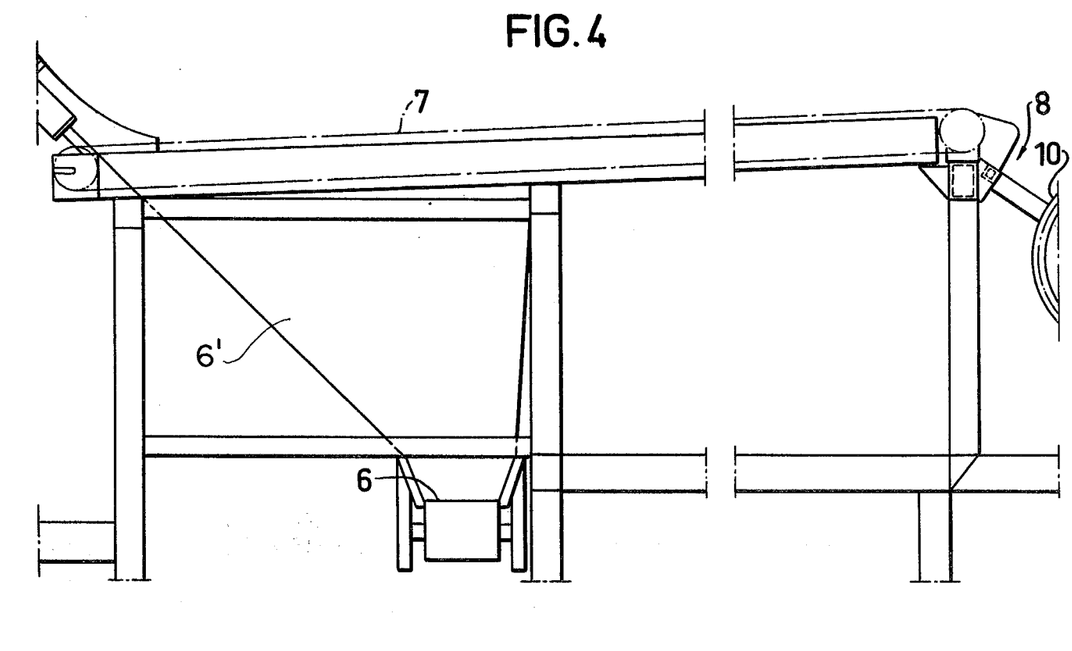
FIG. 4 is a side view illustrating the stick conveyor in greater detail.

A feed conveyor 1, for conveying timber bundles 2, includes a conveyor portion 1a lying outside a trimming saw building proper 3. The timber bundles 2 are positioned on the conveyor portion 1a by means of trucks or other suitable transport devices. By means of the portion 1b lying within the building 3, the feed conveyor 1 is capable of selectively advancing the timber bundles 2 intermittently or one at a time to a tilt device 4. The tilt device 4 includes a bottom 5 which can be raised or lowered to be in connection with the feed conveyor 1 to automatically receive a new timber bundle 2 as soon as a preceding bundle is processed. The tilt device 4, after having supplied itself with a new timber bundle, is pivoted upwardly to the position shown in FIG. 1, and breaks up the bundle to obtain timber pieces and sticks. The smaller sticks drop down onto a stick conveyor 6 while the timber pieces are advanced via a stick removing conveyor 7 to a timber bin 8. As illustrated in more detail in FIG. 4, the stick conveyor 6 receives the smaller sticks which fall through gaps in the stick removing conveyor 7 and into a chute 6'. The sticks are transported by the stick conveyor 6 to a suitable processing station. As shown schematically in FIG. 2, the stick removing conveyor 7 can include a plurality of parallel conveyor belts which are spaced from one another a sufficient distance to allow the sticks to fall through into the chute 6'.

Figure 5:
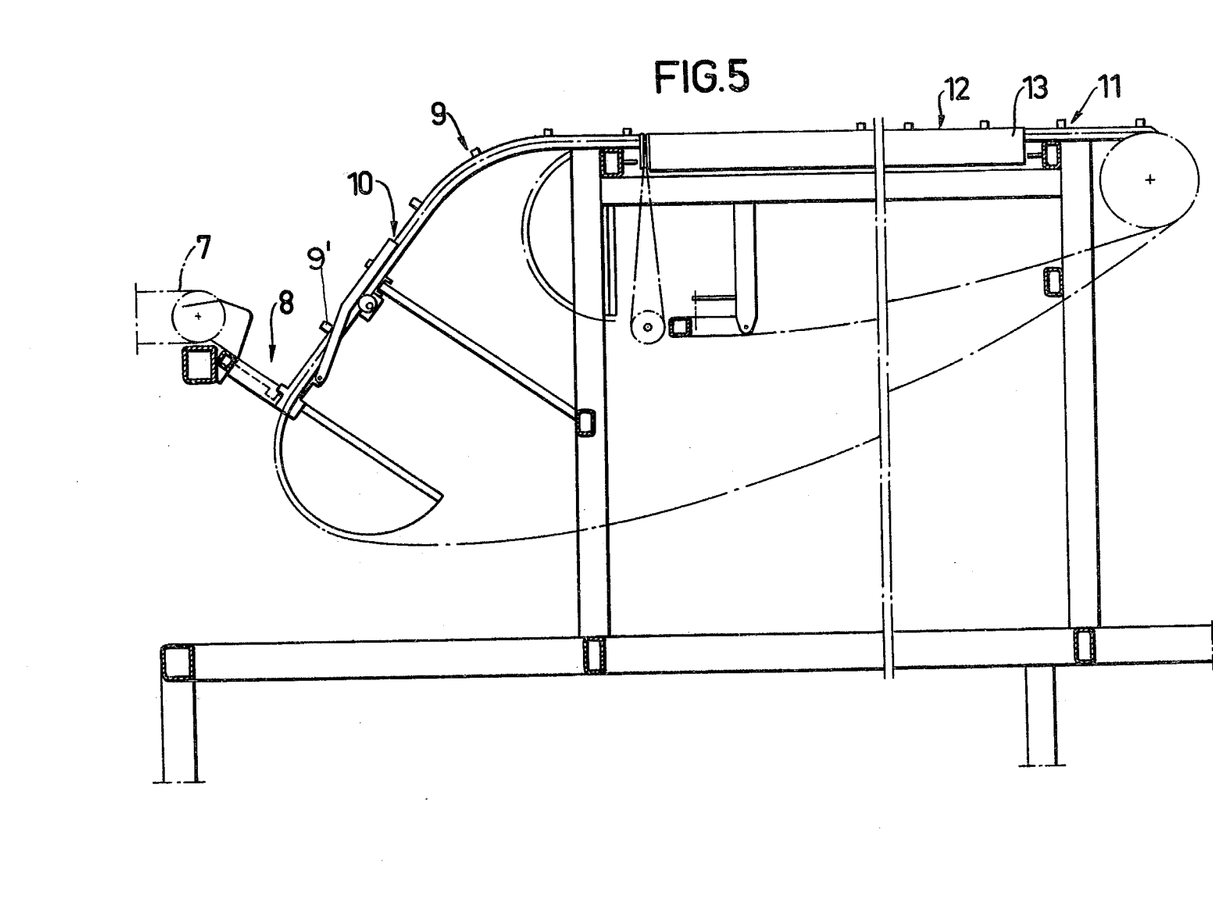
FIG. 5 is a side view illustrating the timber elevator and end alignment device in greater detail.

In the timber bin 8, the timber pieces are advanced by an elevator 9, illustrated in greater detail in FIG. 5. The elevator 9 is provided with lateral pusher members 9'. In operation, one timber piece is transported by each pusher member 9' to an elevation higher than the timber bin 8. The elevator 9 includes an inclined lifting portion 10 and a horizontal conveying portion 11. In the illustrated embodiment, the conveying portion 11 is provided with an end alignment device generally designated by 12. The end alignment device 12 comprises continuously driven cross-conveying rollers 13 and a sound-damping stop shield 14. The rollers 13 move the timber pieces in a longitudinal direction to place their root ends against the shield 14.

Figure 7:
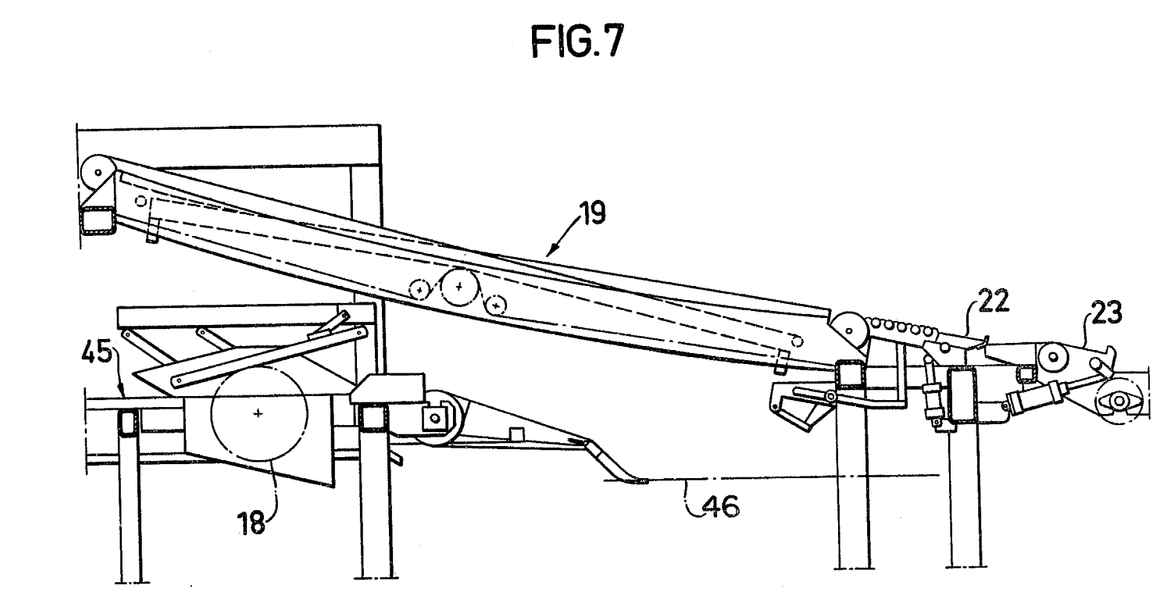
Figure 8:
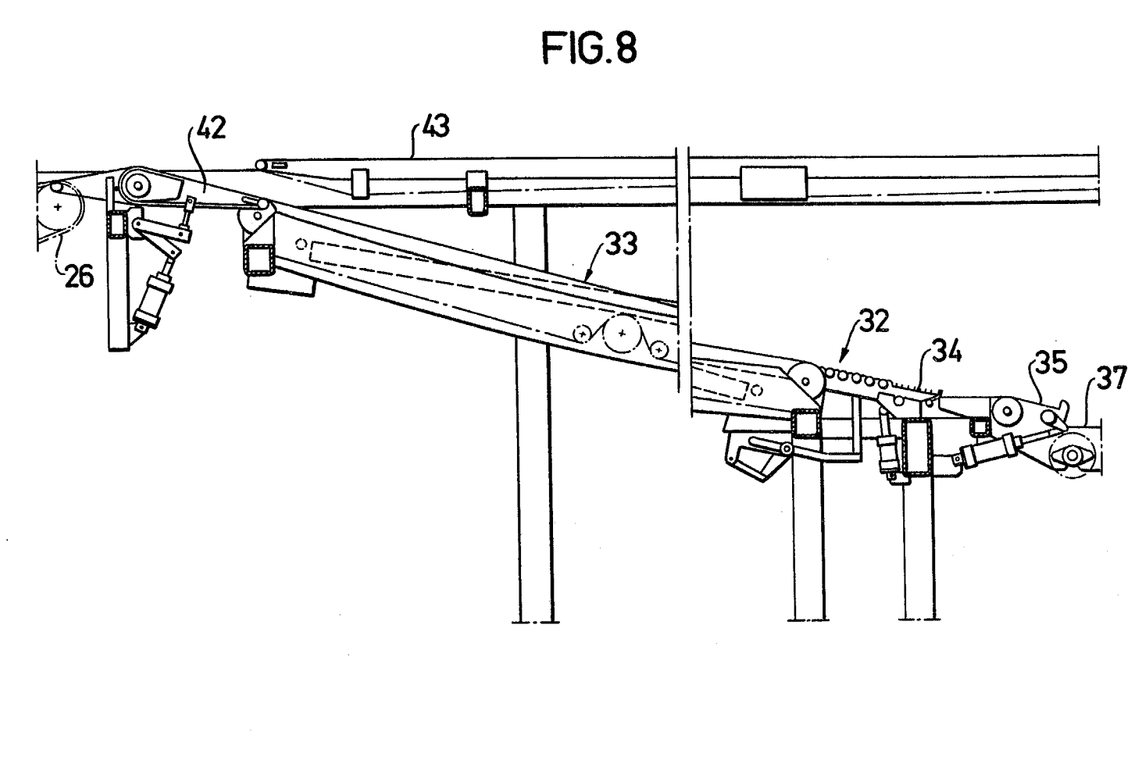
FIGS. 8 and 9 are side views illustrating a trimmer place of a trimmer station in greater detail.

The timber pieces are transferred by the conveying portion 11 from the elevator 9 to a root cross-cutting station generally designated by 16. In this station, the arriving timber pieces are distributed to several root cross-cutting places 17 (two being shown in the illustrated embodiment). As shown in greater detail in FIGS. 6 and 7, each root cross-cutting place 17 includes a root cross-cut saw 18 and an inclined storage zone 19 having a predetermined storage capacity for supplying timber to the saw 18. The timber from the elevator 9 is distributed automatically to the various storage zones 19, responsive to the amount of timber stored in the respective storage zones. This distribution is carried out by means of a pneumatically, hydraulically or electrically controlled flap 20 located in the elevated section of the timber conveying apparatus which extends from the first to the last of the cross cutting places 17. When the storage zone 19 associated with the first root cross-cutting place 17 contains a sufficient amount of timber the flap is moved to the upper position, illustrated in FIGS. 1 and 6, to act as a bridge over the first storage zone and root cross-cutting place. A feed conveyor 21 provided in connection with the flap 20 and forming part of the elevated conveying section leads the timber pieces to the storage zone 19 of a subsequent root cross-cutting place. When this subsequent storage zone is filled, or contains a greater amount of timber than the preceding storage zone, the flap 20 is opened (as shown in FIG. 8 with respect to a trimming place), and the timber pieces are guided to the storage zone 19 of the first root cross-cutting place. By means of this flap 20, the timber pieces can be guided, either manually or fully automatically, to the storage zone 19 which at the moment has the greatest need for timber. Due to this possibility of distributing arriving timber pieces to a plurality of root cross-cutting places, no shutdown of the entire operation need take place when, for example, a root cross-cutting place occasionally is out of operation.

Figure 6:
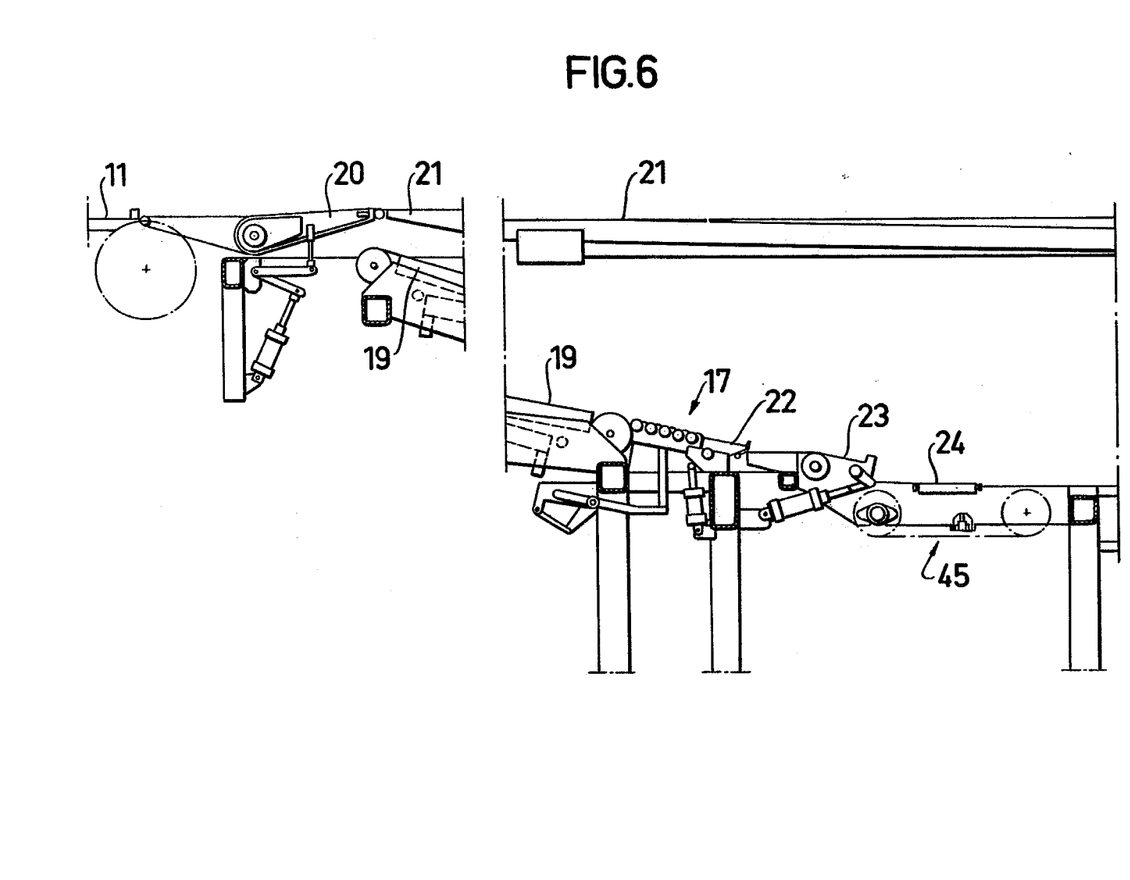
FIGS. 6 and 7 are side views illustrating a root cross-cutting place in greater detail.

Rather, the trimming operation can proceed continuously in the remaining root cross-cutting places.

From the storage zones 19, the timber pieces are individually discharged by means of a single-piece feeder 22 to a board turner 23, which turns every timber piece in a known manner and positions it on a series of cross-conveying rollers 24. These rollers are provided to facilitate movement of the timber pieces in their longitudinal direction so that they can be drawn out manually, i.e., the timber pieces can be adjusted longitudinally in relation to the cross-cut saw 18 prior to cutting by the saw. This adjustment takes place before the pieces are transferred to a cross-cut saw table conveyor 25 common to all of the root cross-cutting places, to facilitate removal of damaged or undersized end portions. The conveyor 25 feeds the timber pieces drawn out in the described manner through the respective root cross-cut saws 18.

The operation of the single-piece feeder 22 and board turner 23 in each root cross-cutting place 17 is normally effected by a root cross-cut saw operator, who preferably also pushes an inspected and manually drawn out timber piece off the series of rollers 24 and onto the table conveyor 25 during the operation. Simultaneously, the single-piece feeder 22 releases a timber piece to the board turner 23. In this manner, the root cross-cut saw operator can immediately direct his attention to the next timber piece released by the single-piece feeder 22 after handling the timber piece on the series of rollers 24 and, thus, control and inspect the timber pieces both before and after they have turned.

Figure 2:
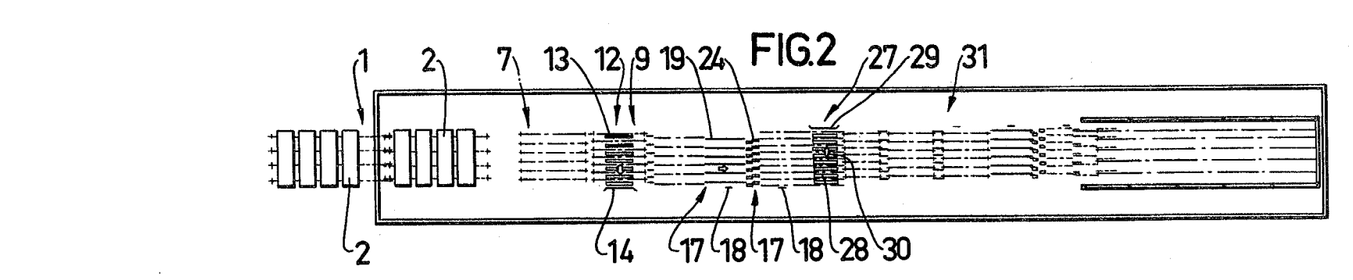
FIG. 2 is a schematic top view of the trimming saw arrangement according to FIG. 1.

After being cross-cut, timber pieces are fed to an elevator or an inclined collection conveyor 26 via an end alignment device 27. The end alignment device 27 is located ahead of the inclined conveyor 26 in the feed direction and is of the same type as the aforementioned end alignment device 12. However, the rollers 28 of the alignment device 27 are driven in the opposite direction as the rollers 13 of the end alignment device 12, in order to place the end of the timber piece which is not cross-cut against the sound-damping stop shield 29 by movement in the longitudinal direction indicated by the arrow 30 (FIG. 2).

Figure 9:
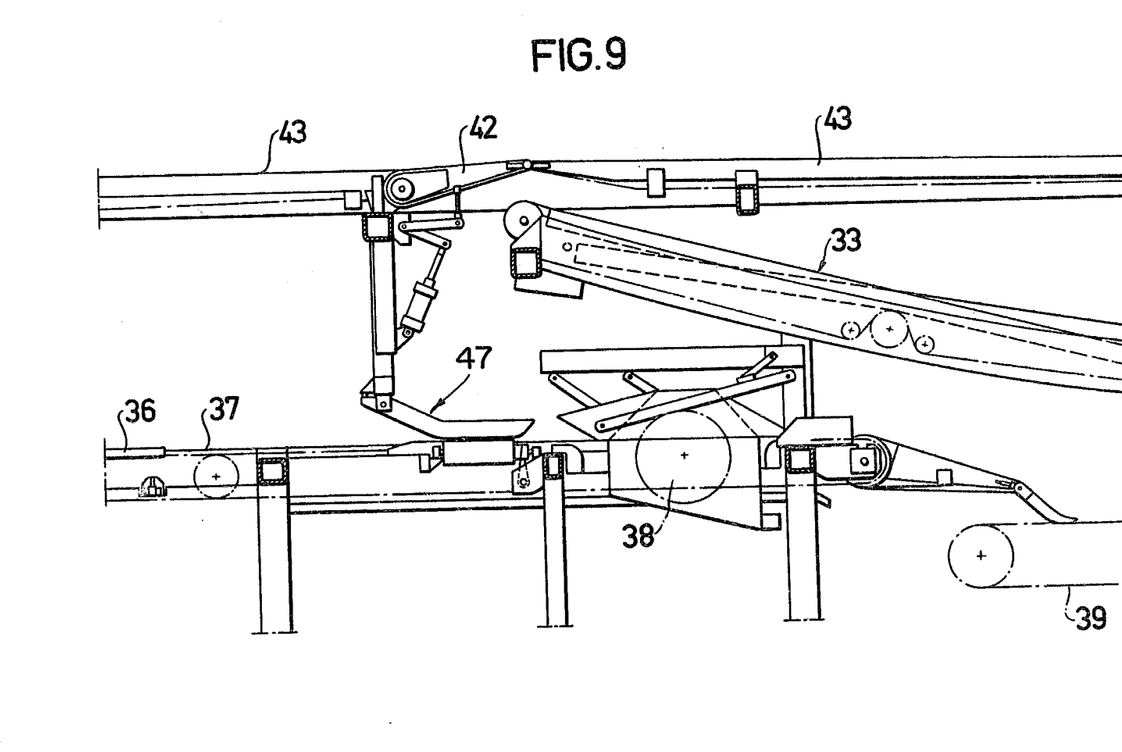

The timber pieces are transported by means of the inclined collecting conveyor 26 from the cross-cut saw conveyor 25 upward to the trimming station 31 of the trimming saw arrangement. Arriving timber pieces are distributed to a plurality of similar trimming places 32 (three places in the illustrated embodiment). As shown in detail in FIGS. 8 and 9, each trimmer place 32 includes a storage zone 33, a single-piece feeder 34, a board turner 35, a series of rollers 36, a trimming place conveyor 37 and a trimming cross-cut saw 38. It can be seen that the trimming places 32 correspond to the root cross-cut saw operator places 17. However, in distinction to the root cross-cut places, each trimming place 32 is provided with a cross-cut saw table or trimming place conveyor 37 and a measuring stand 47, which is located ahead of the trimming saw 38 in the feed direction. The measuring stand 47 adjusts the timber longitudinally to set the length of the timber pieces according to a predetermined modular system so that the pieces are cross-cut by the trimming saw 38 to an intended length, for example 3dm, which is divisible by the module being used.

The timber pieces which have been cross-cut to the intended length and trimmed are advanced from the cross-cut saw table conveyor 37 of the respective trimming place to an aft conveyor 39 common to all trimming places. The aft conveyor 39 conveys the trimmed pieces to a sorting arrangement comprising a sorting conveyor 40 and compartments 41 beneath the conveyor 40 in which the timber pieces are sorted as to quality, which is determined by the trimmers at the various trimming places.

The distribution of the timber pieces to the different trimming places in the trimming station takes place in the same way as in the root cross-cutting station by means of a flap 42 located in an elevated section of the conveying apparatus. The flap 42 can be controlled pneumatically, hydraulically or electrically in response to the amount of timber in the associated storage zone 33. A conveyor 43 forms part of the elevated section and is associated with the flap 42 for each trimming place except the last one, so that the storage zones 33 are always substantially equally filled. When a trimmer occasionally leaves his place, or when, for some other reason, one of the trimming places is put out of operation, the timber pieces entering the trimming station through the flaps 42 can be distributed uniformly to the storage zones 33 of the remaining trimming places. This distribution to the other storage zones 33 preferably takes place after the storage zone of the temporarily non-operative trimming place has been filled.

The operation cycle at the trimming places 32 is substantially the same as at the root cross-cutting places 17. The single-piece feeder 34 at the end of the storage zone 33 releases a timber piece down onto the board turner, which turns the timber piece and positions it onto the series of rollers 36 to transfer the piece to the cross-cut saw table conveyor 37 after quality determination and length setting is carried out. The timber pieces are then cross-cut by the trimming saw 38 and advanced by the conveyor 39 and sorting conveyor 40 to the intended compartment.

When the trimmer has determined the quality of the timber piece lying on the series of rollers 36, he can record the quality of the timber piece in question by depressing a button in a control panel. The control panel can be connected to the electronic control equipment of the trimming saw arrangements, and thereby the quality information is given to the sorting arrangement to designate the compartment into which this timber piece is to be positioned. By this depression, an automatic cycle can also be initiated in which the timber piece lying on the series of rollers 36 is transferred to the trimming place or cross-cut saw table conveyor 37, the timber piece lying in the board turner 35 is turned and positioned on the series of rollers 36, and the single-piece feeder 34 releases a timber piece from the storage zone 33 to the board turner 35. In this case, the trimmer himself determines his working pace. However, it is also possible to control each trimming place wherein the above-mentioned automatic cycle automatically occurs for each pusher member on the trimming place conveyor 37. In this manner, the machine controls the pace of the trimmer instead of vice versa.

Each trimming place conveyor 37 is driven responsive to the sorting conveyor 40 at a speed which, in the illustrated embodiment with three trimming places, is normally one third of the sorting conveyor speed, measured in terms of pusher members per minute. Each trimming place 32 acts as a small independent trimming saw where the work is carried out with one third of the production and at a speed corresponding to one third of the speed of the sorting conveyor. A possible disturbance at one of the trimming places 32 does not affect any one of the remaining trimming places, and the work can proceed continuously at these unaffected places. Owing to this distribution of the timber pieces to several trimming places, it is possible for one or two trimmers to leave their places without thereby causing a shutdown of the entire trimming saw arrangement, as is the case with conventional trimming saws. When, for example, only two trimming places are to be utilized for a long period, it is possible by means of a gear (not shown) to change the speed of the sorting conveyor 40 and the aft conveyor 39, so that these two conveyors run only twice as fast as the trimming place conveyors 37.

The sorting conveyor 40 preferably is driven hydraulically, and its speed can be continuously adjustable from one of the trimming places. The aft conveyor 39 is connected to the sorting conveyor 40 and, thus, is driven at the same speed as the conveyor 40. The sorting conveyor 40, which can include hook-chains, carries the timber pieces over the compartments by means of the hooks on these chains and releases the respective timber piece into the intended compartment through the control of the previously mentioned electronic control equipment.

In order to establish coordination between the root cross-cutting station, which station may comprise a single root cross-cutting place, and the trimming station, as well as continuity of the timber supply from the root cross-cutting station to the trimming station, conveyor 25 common to the root cross-cutting places can be driven at a speed which is controlled responsive to the total amount of timber in all of the storage zones 33 in the trimming station 31. This control can be effected by means of known control devices. In this manner, the conveyor speed increases when the amount of timber in the storage zones 33 of the trimming stations decreases, and vice versa.

Figure 3:
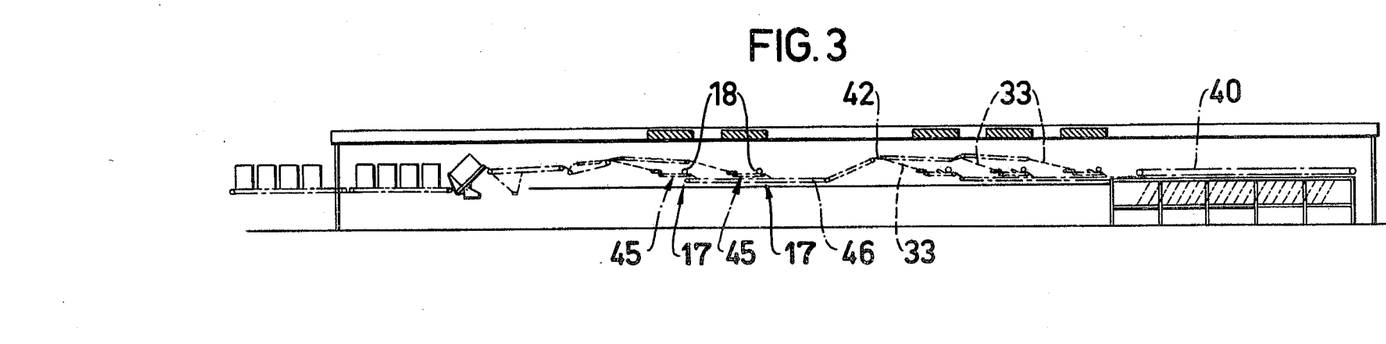
FIG. 3 is a side view of a second embodiment of a trimming saw arrangement according to the present invention.

FIG. 3 illustrates that it also is possible to equip the root cross-cutting places 17 with separate cross-cut saw table conveyors 45, on which respective cross-cut saws 18 are provided. These cross-cut saw table conveyors 45 deliver the coarsely cross-cut timber pieces onto a conveyor 46 common to all root cross-cutting places 17. The separate cross-cut saw table conveyors are driven at a speed half as high as the speed of the conveyor 46. This conveyor may be driven hydraulically, and its speed may be continuously adjustable. The speed is controlled from one of the root cross-cutting places and may be adapted so as to keep the trimming places supplied with timber without interruption during normal operation. When the storage zones 33 of the trimming places are entirely filled, the conveyor 46 and the cross-cut saw table conveyors 45 are stopped completely, as is the cross-cut saw table conveyor 25 in the embodiment according to FIGS. 1 and 2. If this happens too frequently, it indicates that the speed of the cross-cut saw table conveyors is too high and must be reduced. When, however, the storage zones 33 of the trimming places are empty too often, the speed of the conveyor at the root cross-cutting station must be increased.

The invention is not restricted to the embodiment described above and shown in the drawing, but can be modified and changed in many different ways within the scope of the appended claims. It is possible, for example, to utilize the principles of the invention at trimmer plants where the root and trimming cross-cut saws are arranged in the same line perpendicularly to the feed direction and cross-cut simultaneously at both ends according to the setting made in the trimming places of the trimming station. The trimming places of such plants therefore have no trimming cross-cut saw.

The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

I claim:

1. An apparatus for trimming boards comprising
   a first end cutting station for cutting off boards at a first end;
   a second end trimming station for trimming boards at a second end to desired lengths;
   conveying means defining a conveying path for moving boards in a direction transverse to the longitudinal axes of the boards sequentially to said first end cutting station and then to said second end trimming station and from said second station to a sorting conveyor of a sorting device;
   said second end trimming station consisting of a plurality of separate trimming places arranged one after the other in said conveying direction, each one of said trimming places including a trimming saw means for trimming the boards at said second end to the desired lengths, an inclined storage zone for storing a supply of boards, and a collecting conveyor for conveying boards in a conveying path from said storage zone to the trimming saw means;
   said conveying means including an aft conveyor extending below said collecting conveyor for conveying trimmed boards from said trimming places to the sorter conveyor; and
   a distributor device arranged in an elevated section of the conveying means, which section extends from the first trimming place to the last trimming place of said second end trimming station, for distributing boards arriving at the second end trimming station to said separate trimming places in response to the amount of boards stored in the respective storage zones in the second end trimming station.

2. Apparatus according to claim 1, wherein said first end cutting station located upstream from the second end trimming station includes a plurality of separate root cross-cutting places arranged one after the other in said conveying direction, each one of said root cross-cutting places including a cutting saw means for cutting off said first ends of the boards, an inclined storage zone for storing a supply of boards, and a feed conveyor for conveying boards from said storage zone to the cutting saw means; and
   a distributor device arranged in an elevated section of the conveying means, which section extends from the first root cross-cutting place to the last root cross-cutting place of the first end cutting station for distributing boards arriving at said first end cutting station to said separate cross-cutting places in response to the amount of boards in the respective storage zones in said first end cutting station.

3. Apparatus according to claim 2, wherein the distributor devices of the first end cutting station and of the second end trimming station each comprises a flap located in the respective elevated section of the conveying path for each of the places except the last one in the station, each one of said flaps being operable in response to the amount of boards in the storage zones to move between a first position in which the flap directs the boards on said conveying means to a subsequent place, and a second position in which the flap directs the boards into the particular place associated therewith.

4. Apparatus according to claim 1, wherein each said collecting conveyor in the second end trimming station has a speed which is as many times less than the speed of the aft conveyor of the conveying means as the number of trimming places in said second end trimming station.

5. Apparatus according to claim 4, wherein said aft conveyor has a speed corresponding to that of the sorting conveyor.

6. Apparatus according to claim 2, wherein said feed conveyor in the first end cutting station forms a part of said conveying means and is a conveyor common to all of said root cross-cutting places.

* * * * *